United States Patent
Han et al.

(10) Patent No.: US 10,396,901 B2
(45) Date of Patent: Aug. 27, 2019

(54) RECEPTION OF MULTIPLE-WAVELENGTH OPTICAL SIGNALS CONSISTING OF SINGLE-BAND OPTICAL BURSTS

(71) Applicant: Orange, Paris (FR)

(72) Inventors: Bing Han, Lannion (FR); Mengdi Song, Lannion (FR); Paulette Gavignet, Trégastel (FR); Erwan Pincemin, Gommenec'h (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/750,136

(22) PCT Filed: Aug. 1, 2016

(86) PCT No.: PCT/FR2016/052001
§ 371 (c)(1),
(2) Date: Feb. 2, 2018

(87) PCT Pub. No.: WO2017/021645
PCT Pub. Date: Feb. 9, 2017

(65) Prior Publication Data
US 2018/0227058 A1 Aug. 9, 2018

(30) Foreign Application Priority Data
Aug. 5, 2015 (FR) .................................. 15 57561

(51) Int. Cl.
*H04B 10/00* (2013.01)
*H04B 10/61* (2013.01)
(Continued)

(52) U.S. Cl.
CPC .......... *H04B 10/615* (2013.01); *H04B 10/40* (2013.01); *H04B 10/63* (2013.01)

(58) Field of Classification Search
CPC ......... H04B 10/61; H04B 10/63; H04B 10/64
See application file for complete search history.

(56) References Cited

U.S. PATENT DOCUMENTS

2010/0178056 A1 7/2010 Liu
2010/0310256 A1 12/2010 Shpantzer et al.
(Continued)

OTHER PUBLICATIONS

International Search Report and Written Opinion dated Nov. 3, 2016 for Application No. PCT/FR2016/052001.
(Continued)

*Primary Examiner* — Daniel G Dobson
(74) *Attorney, Agent, or Firm* — Knobbe, Martens, Olson & Bear, LLP (57) ABSTRACT

A coherent optical receiver capable of receiving a multiple-wavelength optical signal comprising a series of single-band optical bursts is described. Each single-band optical burst is carried by one wavelength from among a plurality of wavelengths on a predetermined spectral band. The optical receiver can include optical generation means arranged to generate a local multiple-wavelength optical oscillator consisting of a plurality of optical lines at wavelengths corresponding to the wavelengths of the optical bursts, optical mixing means arranged to mix the optical oscillator and the optical signal in order to generate at least one mixed optical signal comprising a plurality of beats between at least one of the single-band optical bursts and the optical lines of the local multiple-wavelength optical oscillator, and a detection means to filter at least one beat between said single-band optical burst and one of the optical lines of the local multiple-wavelength optical oscillator.

14 Claims, 5 Drawing Sheets

(51) Int. Cl.
*H04B 10/40* (2013.01)
*H04B 10/63* (2013.01)
*H04J 14/00* (2006.01)

(56) References Cited

U.S. PATENT DOCUMENTS

2013/0177027 A1    7/2013  Rasras
2015/0229409 A1*  8/2015  Chen .................. H04B 10/6161
                                                                      398/208

OTHER PUBLICATIONS

"Terms and definitions for Sub-Lambda Photonically Switched Networks", ITU, COM15-C2322 Rev.-E, Geneva, Aug. 2012.
Pincemin, et al., "Multi-band OFDM Transmission with Sub-band Optical Switching", Proc. ECOC 2013, invited paper Th.2.A.1 (2013).

* cited by examiner

RECEPTION OF MULTIPLE-WAVELENGTH OPTICAL SIGNALS CONSISTING OF SINGLE-BAND OPTICAL BURSTS

RELATED APPLICATIONS

This application is the U.S. National Phase of Application No. PCT/FR2016/052001 entitled "RECEPTION OF MULTIPLE-WAVELENGTH OPTICAL SIGNALS CONSISTING OF SINGLE-BAND OPTICAL BURSTS" filed Aug. 1, 2016, which designated the United States, and which claims the benefit of French Application No. 1557561 filed Aug. 5, 2015.

The field of the invention is that of optical communication networks. More specifically, the invention relates to improving the use of the network resources in such optical networks.

The exponential growth of the volume of the data exchanged within the optical communication networks demands an ongoing growth in the increase in the bit rate of the transmission interfaces, which are now reaching 100 Gbit/s and above.

The counterpart of this increase in the bit rate of the interfaces is that the filling of the transmission channels can be relatively inefficient without a costly electronic aggregation in terms of optical-electrical-optical (O-E-O) conversion interfaces that is energy inefficient.

Traditionally, there were two types of optical solutions allowing access to the sub-wavelength granularity thus leading to a better use of the resources by more efficiently filling the transmission channels. The first type of solution uses the time domain, and is called the SLPSN (Sub-Lambda Photonically Switched Networks) solution, as described in particular in "Terms and definitions for Sub-Lambda Photonically Switched Networks", ITU, COM15-C2322 Rev.-E, Geneva, August 2012; the second type of solution uses the spectral domain, and is called multi-band OFDM (Orthogonal Frequency Division Multiplexing), as described in particular by E. Pincemin et al., in "Multi-band OFDM Transmission with Sub-band Optical Switching,", Proc. ECOC 2013, invited paper Th.2.A.1 (2013).

The SLPSN ("Sub-Lambda Photonically Switched Networks") solutions rely on the photonic switching of time slices of wavelengths called bursts, slots or, more generally, SLPS Units (SLPSUs). For that reason, the SLPSN solutions differ from the TDM ("Time Division Multiplexing") techniques such as OTN/SDH ("Optical Transport Network/Synchronous Digital Hierarchy"), but also from the packet techniques (ATM ("Asynchronous Transfer Mode"), Ethernet, IP ("Internet Protocol"), etc.), which apply this switching in the electrical domain. They differ also from the optical circuit switching (OCS) solutions, which implement the switching of entire wavelengths, for very long durations and with slow switching/reconfiguration times (of the order of ten or so milliseconds).

The spectral solutions for accessing the sub-wavelength granularity rely on the use of the multi-band "Orthogonal Frequency Division Multiplexing" (MB-OFDM) modulation format consisting of different independent frequency bands that can be routed in a meshed network separately. The multi-band OFDM technology thus consists in juxtaposing the spectral bands corresponding to several independent OFDM multiple-wavelength signals, so as to transport higher bit rates than would be possible with a single-band technology. Each OFDM signal is made up of several hundreds of sub-carriers (128, 256, 512, etc.).

Recently, a solution relying on access to the sub-wavelength granularity both in the time domain and in the spectral domain has been proposed. This solution envisaged combining the temporal solution for access to the sub-wavelength granularity (SLPSN), by using optical bursts of data (transmitted over very short times of the order of a few µs), and the spectral solution for access to the sub-wavelength granularity as offered by the MB-OFDM technology, by using a juxtaposition of spectral bands corresponding to independent OFDM signals.

This solution is based on an optical burst switching mechanism, allowing an optimum switching in the "core" nodes of the optical network, in which the optical transmitters of the source nodes can be tuned while the optical receivers of the destination nodes cannot. In other words, a specific wavelength is associated with each destination node, the source nodes being able to transmit at any wavelength. The switching of the bursts of data is thus based on the coloring (i.e. the wavelength) of the optical bursts at the core node, and, possibly, on the pre-configuration of the color received by the destination node when the destination nodes use coherent receivers.

An alternative system could however also be envisaged, in which the optical receivers of the destination nodes can be tuned in wavelength, the optical transmitters of the source nodes then being able to be in wavelength (in this case, each wavelength is associated with a source node, and it is the receiver which has to be tuned to the wavelength which is intended for it) or being able to tuned in wavelength (in this case, a color—or wavelength—is associated with a link, a link being defined by the source and destination nodes that it links for the duration of the transmission of the bursts between these two nodes).

In such a system, colored bursts of data using, for example, OFDM modulation with coherent detection can circulate in the network. From a spectral point of view, these bursts are arranged in the form of subbands of a width typically lying between 8 and 10 GHz, centered on wavelengths spaced apart by 10 GHz. From a temporal point of view these bursts of data can have a typical duration of around 5 µs and can be separated by timeslots of approximately 500 ns during which no useful data is transported (for example in the form of an inter-burst interval of 300 ns completely void of data and a preamble of 200 ns during which only synchronization data, for the purpose of recovering a clock, are transmitted).

To be able to receive and detect such "colored bursts" at the destination nodes, it is necessary to have coherent receivers which can be very rapidly tuned, in order to be able to very rapidly change color (i.e. wavelength) in reception, between two consecutive bursts. In effect, the conventional coherent optical receivers use, as local oscillator, tunable lasers whose wavelength must be set to the wavelength of the data signal received to be able to detect this signal.

Thus, given the colored burst characteristics described previously, to be able to detect series of colored bursts (at different wavelengths) with a single coherent optical receiver using a tunable laser as local oscillator, this tunable laser has to be able to lock on in less than 100 ns to the wavelength to be received (including the time interval necessary for channel estimation). In addition, its line width should not exceed 100 kHz so as not to generate a prohibitive level of phase noise.

Now, the tunable lasers currently known do not offer such performance levels. These tunable lasers can be classified according to the three wavelength control methods generally used:

The lasers with temperature-controlled wavelength adjustment, such as the DFB (Distributed Feedback) lasers. With these lasers, the setting range is of the order of 2 to 3 nm. A temperature variation of one degree makes it possible to vary the wavelength by 0.1 nm, i.e. 2 nm for 20 degrees. The time to change length is of the order of a millisecond, which is much too slow to adjust the wavelength between two successive colored bursts.

The lasers with mechanically controlled wavelength adjustment, such as the vertical cavity surface emission lasers (VCSELs) using an adjustment of the length of the laser cavity by micromirror with electromechanical setting (MEMS), and the external cavity lasers (ECLs). Although these types of lasers exhibit very fine line widths, of the order of a few tens of kHz (typically 50-100 kHz), their switching time is, respectively, of the order of a microsecond for the VCSELs with MEMS and of the order of millisecond for the ECLs, which is also too long.

The lasers with electronically-controlled wavelength adjustment, such as the DS-DBR (Digital Supermode Distributed Bragg Reflector) lasers, exhibiting a response time typically of the order of 100 ns. Unfortunately, their line width of the order of 2 MHz generates an excessively strong level of phase noise. Another class of lasers, the SG-DBR (Sampled-Grating Distributed Bragg Reflector) lasers or their derivatives, the MG-Y (Modulated-Grating Y-branch) lasers, also rapidly adjust their wavelength (typically in 10 ns depending on the speed of the control electronics used) but have a line width that is insufficiently fine, of the order of 1 to 5 MHz.

Thus, there is currently no tunable laser that is fast enough, and which also has a sufficiently fine line width, to make it possible to produce a local oscillator in a rapidly tunable coherent receiver that is suited to the colored burst-type signals.

The application US 2010/0310256 describes, for its part, a coherent optical receiver for the reception of conventional multiple-wavelength (WDM) optical signals (i.e. of "continuous circuit" type). This receiver thus comprises a system for generating a set of N single-wavelength local oscillators with distinct wavelengths, from a single source demultiplexed into wavelengths. It further comprises a demultiplexer for demultiplexing the multiple-wavelength optical signal to be received into N single-wavelength components, each of these components then being mixed with the corresponding single-wavelength local oscillator before detection of the optical mix obtained at this single specific wavelength.

Such an optical receiver is however very complex and costly, because it requires the combination of a large number of components, in particular 1×N optical demultiplexers both for the signal to be received and for the local oscillators to be generated, N optical hybrids and N photoreceivers (each wavelength considered of the WDM optical signal with N wavelengths). In addition, such an optical receiver does not lend itself to upgrades because of the mandatory use of 1×N optical demultiplexers coupled to N optical hybrids, which becomes a problem when the wavelength grid employed on the network changes. The present invention provides a response to these drawbacks, by proposing a coherent optical receiver, of simple design and which is capable of effectively detecting a multiple-wavelength optical signal composed of a succession of single-band optical bursts.

To this end, it proposes a coherent optical receiver capable of receiving a multiple-wavelength optical signal composed at least of a succession of single-band optical bursts, each single-band optical burst being carried by a wavelength out of a plurality of carrier wavelengths over a determined spectral band, the optical receiver comprising:

optical generation means arranged to deliver a multiple-wavelength optical local oscillator composed of a plurality of optical lines with wavelengths corresponding to the carrier wavelengths;

optical mixing means arranged to mix the multiple-wavelength optical local oscillator and the multiple-wavelength optical signal in order to deliver at least one optical signal, called mixed optical signal, composed of a plurality of beats between at least one of the single-band optical bursts and the optical lines of the multiple-wavelength optical local oscillator; and detection means whose passband is arranged to filter, from the mixed optical signal, at least one beat between said at least one single-band optical burst and one of the optical lines of the multiple-wavelength optical local oscillator.

It is thus possible to implement an optical receiver capable of receiving multiple-wavelength optical bursts, without having to make use of mechanisms for adjusting the wavelength of components such as lasers to detect different wavelengths, and therefore dispensing with the constraints of rapid tunability of these components that are difficult to make compatible with the reception of multiple-wavelength optical bursts. Furthermore, this receiver allows the reception of multiple-wavelength bursts without having to use spectrally fixed optical demultiplexers and without requiring the proliferation of components to be combined with one another in proportion to the number of wavelengths used in the network.

In a particular embodiment, the passband of the detection means is arranged to let pass only the beat between said at least one single-band optical burst and the optical line of wavelength corresponding to the wavelength carrying said at least one single-band optical burst and reject the beats between said at least one single-band optical burst and the other optical lines of wavelength not corresponding to the wavelength carrying said at least one single-band optical burst.

This embodiment, by making it possible to directly and simply obtain the signal to be detected from the bursts received without needing to use additional components or a particular control plane, is particularly appropriate for an optical network of organizing the bursts in such a way that they arrive in succession, without time overlap, at the destination node.

In a particular embodiment, the optical generation means comprise an optical source generating a continuous wavelength optical signal and a multiple-wavelength generation module arranged to deliver, from the continuous wavelength optical signal received from the optical source, the multiple-wavelength optical local oscillator, which makes it possible to implement, simply, and in an energy and cost efficient way, this type of optical receiver.

Advantageously, the optical source generates an optical signal of spectral line width less than 400 kHz, in particular of spectral line width equal to 100 kHz. With this feature, such an optical receiver, in addition to its capacity to receive multiple-wavelength optical bursts, exhibits a low phase noise, allowing a correct detection of the data transmitted on the bursts received.

In a particular embodiment, the detection means comprise at least one optical module, in particular an optical filter and/or a photo-electrical conversion module, the passband of the processing means corresponding to the passband of the optical module and exhibiting a spectral width greater than the width of the spectral band of said at least one single-band optical burst.

The filtering of the beat for each burst is then done in the optical domain, with all that brings in terms of advantages associated with the processing in the optical domain, particularly in terms of integration with other optical components.

In another particular embodiment, the detection means comprise a photo-electrical conversion module followed by at least one electrical module processing the mixed optical signal after conversion in the photo-electrical conversion module, in particular an analog-digital conversion module and/or a digital processing module, the passband of the processing means corresponding to the passband of the electrical module and exhibiting a spectral width greater than the half-width of the spectral band of said at least one single-band optical burst.

The filtering of the beat for each burst is then done in the electrical domain, with a fineness of filtering specific to the electrical components, making it possible to simply isolate spectral bands which would be difficult to isolate in the optical domain because of their low spectral width, particularly when the latter is less than 10 GHz.

Advantageously, the passband of the detection means covers at least one central frequency equal to the difference between the wavelength carrying said at least one single-band optical burst and the wavelength of the optical line corresponding to said carrier wavelength, in particular a zero central frequency.

The filtering of the beat for each burst is then done by using electrical components working in baseband mode, such as analog-digital converters offering a reduced quantization noise as well as a better passband.

According to another aspect of the invention, the spectral bands of the single-band optical bursts are separated by a guard spectral interval and in which the width of the passband of the detection means is less than the half-sum of the width of the spectral band of one of the single-band bursts and of the widths of the guard spectral intervals surrounding it.

There is thus a guarantee that a single beat is retained, for each single-band optical burst received, and therefore that the electrical signal at the output of the detection means directly supplies the spectral subband of data to be received, without needing to process this signal before to filter other beats therefrom.

In an advantageous embodiment, the width of the spectral band of the single-band optical bursts is less than or equal to 8 GHz and in which the width of the guard spectral intervals is greater than or equal to 1 GHz and in which the width of the passband of the detection means lies between 4 and 5 GHz.

The present invention also targets an optical transceiver capable of receiving a first multiple-wavelength optical signal and of transmitting a second multiple-wavelength optical signal composed of a succession of single-band optical bursts, each single-band optical burst being carried by a wavelength out of a plurality of carrier wavelengths over a determined spectral band, the optical transceiver comprising:

optical generation means arranged to deliver a multiple-length optical local oscillator composed of a plurality of optical lines with wavelengths corresponding to the carrier wavelengths;

optical mixing means arranged to mix a part of the multiple-wavelength optical local oscillator and the first multiple-wavelength optical signal in order to deliver at least one optical signal, called mixed optical signal, composed of a plurality of beats between at least one of the single-band optical bursts and the optical lines of the multiple-wavelength optical local oscillator;

detection means whose passband is arranged to filter, from the mixed optical signal, at least one beat between said at least one single-band optical burst and one of the optical lines of wavelength of the multiple-wavelength optical local oscillator; and transmission means arranged to receive at least part of the multiple-wavelength optical local oscillator and generate the second multiple-wavelength optical signal by means of said at least part of said multiple-wavelength local optical signal.

In such a transceiver, in addition to the advantages on the reception side already mentioned in terms of compatibility with the reception of multiple-wavelength optical bursts, part of the multiple-wavelength signal generated locally is reused to transmit bursts, which represents a cost saving in terms of laser pooling. In addition, the use of such transceivers in optical network nodes makes it possible to simply implement an architecture with wavelength tunability both in transmission and in reception, in which a wavelength can be used for a given network link, offering enhanced flexibility.

In a particular embodiment, these transmission means comprise:

an optical demultiplexer arranged to separate said at least part of the multiple-wavelength optical local oscillator into a plurality of single-wavelength optical signals corresponding to said optical lines;

a plurality of optical gates respectively receiving said optical signals corresponding to said optical lines, an optical multiplexer combining the outputs of said optical gates; and an optical modulator arranged to modulate, over a determined spectral bandwidth, the optical signal at the output of the optical multiplexer with data to be transmitted.

The present invention also targets a method for coherent reception of a multiple-wavelength optical signal in an optical network, said multiple-wavelength optical signal being composed of a succession of single-band optical bursts, each single-band optical burst being carried by a wavelength out of a plurality of carrier wavelengths over a determined spectral band, the method comprising the following steps:

generating a multiple-wavelength optical local oscillator composed of a plurality of optical lines with wavelengths corresponding to the wavelengths;

mixing the multiple-wavelength optical local oscillator and the multiple-wavelength optical signal in order to deliver at least one optical signal, called mixed optical signal, composed of a plurality of beats between at least one of the single-band optical bursts and the optical lines of the multiple-wavelength optical local oscillator; and filtering, from the mixed optical signal, at least one beat between said at least one single-band optical burst and one of the optical lines of the multiple-wavelength optical local oscillator.

According to an advantageous feature of the invention, the steps of mixing and of filtering are repeated iteratively for each successive single-band optical burst of which the multiple-wavelength optical signal is composed.

The present invention finally targets an optical network comprising at least one coherent optical receiver and/or an optical transceiver as described hereinabove.

Other aims, features and advantages of the invention will become more clearly apparent on reading the following description, given as a simple illustrative and nonlimiting example, in relation to the figures, in which.

Figure 1:
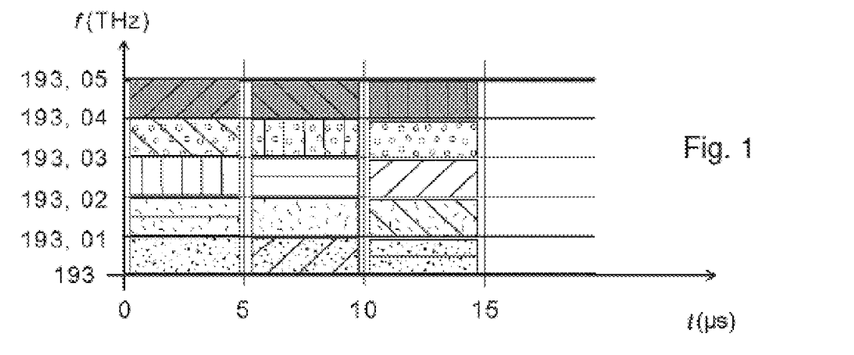
FIG. 1 presents the general principle of subdivision of the transmission channel in the time and spectral domains.

There now follows a presentation, in relation to FIG. 1, of an exemplary representation of a transmission channel subdivided in the time and spectral domains, namely:
- a temporal subdivision by data burst (in FIG. 1, the data bursts exhibit a duration of 4.5 is for a slot duration of 5 μs for example) and
- a spectral subdivision by band (here 10 GHz, five bands being illustrated in FIG. 1 to form a 50 GHz channel).

In FIG. 1, the background frames (shaded, dots, spots, etc.) each correspond to a different spectral band of a multi-band signal (for example of OFDM type) and the cross-hatching (oblique, vertical, horizontal, etc. lines) correspond to different contents in the different bursts formed by this subdivision. Five spectral bands have been represented, namely:
- a first spectral band [193 THz; 193.01 THz];
- a second spectral band [193.01 THz; 193.02 THz];
- a third spectral band [193.02 THz; 193.03 THz];
- a fourth spectral band [193.03 THz; 193.04 THz];
- a fifth spectral band [193.04 THz; 193.05 THz].

Three timeslots have also been represented, namely:
- a first timeslot from 0 to 5 μs;
- a second timeslot from 5 to 10 μs;
- a third timeslot from 10 to 15 μs.

In the example of FIG. 1, the smallest data quantum (one spectral band, one timeslot) is made up of a signal occupying a spectral band of 10 GHz and a duration of 4.5 μs.

Thus, the "multi-band OFDM" channel is subdivided in time into timeslots (also called bursts), which can be of variable duration (between a few microseconds and a few milliseconds); likewise, in the frequency domain, the burst sees its spectral band, and consequently its transmission capacity, reduced by a factor equal to the number of bands that make up the multi-band OFDM channel. The capacity quantum is then equivalent to the potential capacity quantum of an optical packet of a duration several times smaller than the bursts of the traditional switching technique called "OBS". For example, the embodiment illustrated in FIG. 1 makes it possible to obtain the equivalent of a capacity for a packet of a duration of 0.9 μs in a traditional spectral band of 50 GHz.

It is important to remember here that the OFDM modulation applied to the optics provides not only a fineness of management of the spectrum in its multi-band version, but also the possibility of finely adapting to the transmission channel. In effect, the flexibility in terms of choice of modulation (bit rate and format) for each OFDM band and within the OFDM signal itself, offers a multiplicity of combinations making it possible to perfectly adapt the quantity of resources used to the quantity of data to be transported and to the range (in distance) objectives. It should also be noted that an OFDM multi-band signal contains several optical bands, each optical band corresponding to a transmission wavelength of a laser and being able to contain a certain number of electrical sub-carriers (typically several hundred).

Figure 2:
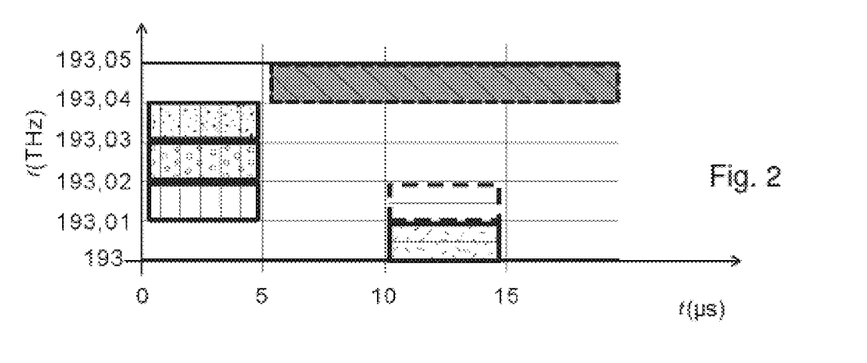
FIG. 2 illustrates an example of distribution of the data in the timeslots and the spectral bands with this type of subdivision of the transmission channel.

FIG. 2 illustrates an example of possible distribution of data in the slots and the bands in an embodiment of the invention. Thus, it is possible to occupy several timeslots (i.e. by using several successive bursts) in a spectral band, as illustrated by the rectangle with shaded frame and with oblique cross-hatching. It is also possible to have a burst of data distributed over several OFDM bands, as illustrated by the block with vertical cross-hatching, grouping together three single-band bursts respectively with frames of white background, with dots and with spots: this for example makes it possible to broadcast one and the same content to several recipients, and to be able to transmit a higher data rate than could be supported by a single OFDM band for a single recipient.

More generally, it is possible to use a data quantum or a combination of data quanta on the time and/or spectral axis. Also, it is possible to set the bit rate within a data quantum itself (10 Gbit/s, 25 Gbit/s or 50 Gbit/s for example).

Thus, the combination of the two domains, time and spectral, makes it possible:
- to have smaller data quanta than in the prior art (like those of the optical packet switching OPS technique), but without suffering the same technical constraints at the optical component level, particularly in terms of processing speed;
- to have a very high capacity network (by virtue of the very high bit rates that can be achieved with the OFDM multiple-wavelength modulation technique), with access to a very fine granularity (by virtue of the use of bursts) and a very great flexibility in the management of the resource (variable bit rates and modulation formats, possibility of bursts of variable duration);
- to use network architectures used for lossless SLPSN solutions (which are based on wavelength routing) with core nodes transparent to the bit rate and format (without optical/electrical/optical conversion) and therefore economical in terms of energy consumption;
- to produce architectures for networks covering both the "periphery" and the core network,
- a greater number of source and/or destination nodes than for the SLPSN solutions of the prior art (multiplication by a factor equal to the number of possible spectral bands), each band being able to be associated with a destination node. Furthermore, a destination node can also have access to several spectral bands of the transmission channel if it needs a lot of bit rate.

Figure 3:
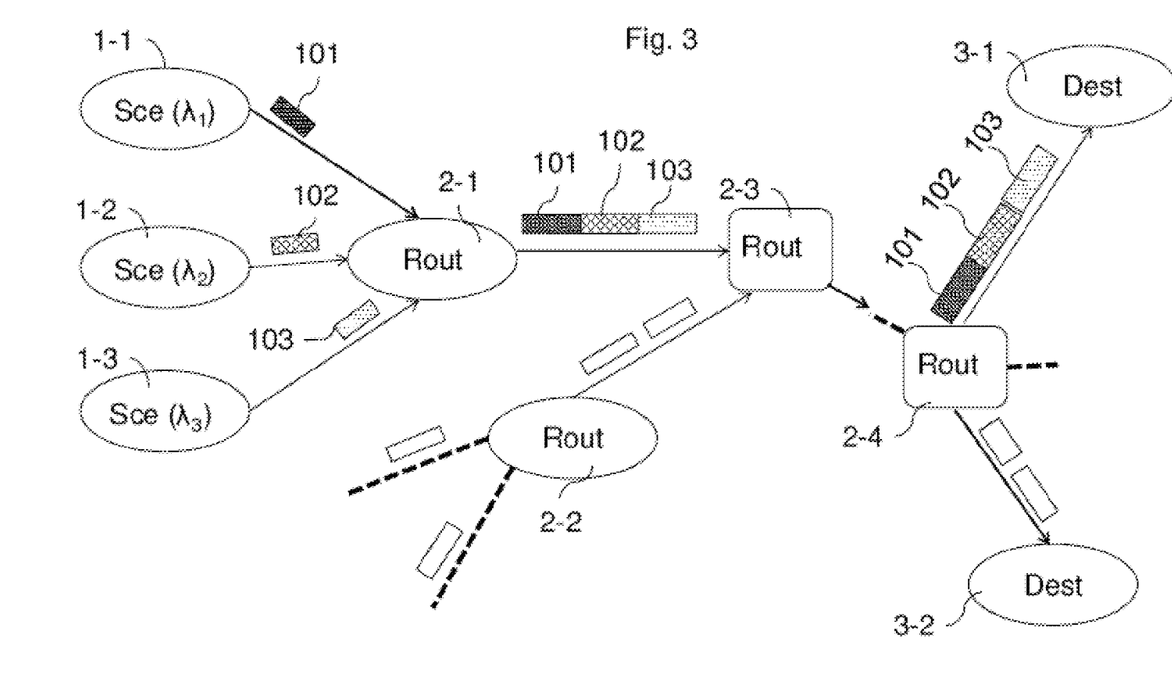
FIG. 3 presents an example of an optical network relying on a wavelength tuning solution at the destination nodes.

There now follows a description, in relation to FIG. 3, of an example of an optical network relying on a wavelength tuning solution at the destination nodes.

Such an optical network comprises a set of source nodes with fixed wavelength, of which have been more particularly represented, by way of example, sources referenced 1-1, 1-2, 1-3. Each of these sources transmits single-band optical bursts of data at a wavelength specifically associated with the source, $\lambda_1$ being associated with the source 1-1, $\lambda_2$ being associated with the source 1-2 and $\lambda_3$ being associated with the source 1-3.

For a given burst, the data occupy a relatively narrow spectral band (less than 10 GHz) covering (typically centered on) the wavelength $\lambda_1$ used to transmit the burst, this spectral band advantageously exhibiting a profile of substantially rectangular form (for example with an edge slope greater than 4 dB/GHz, in particular lying between 4 and 8 dB/GHz) to optimize the spectral occupancy of the data. It can in particular relate to data modulated in the OFDM (Orthogonal Frequency Division Multiplexing) format, of multi-carrier type or even data modulated in the Nyquist-WDM format (generated from a single-carrier signal with high symbol rate that is filtered to make it rectangular). Herein below, the particular example of OFDM modulation is used, in a completely nonlimiting way.

Thus, from a temporal point of view, the source referenced 1-1 transmits a single-band optical burst referenced 101 after the source referenced 1-2 has transmitted a single-band optical burst referenced 102, itself transmitted after the transmission by the source referenced 1-3 of a single-band optical burst referenced 103, all these bursts being intended for the same destination node. Here, the term "colored bursts" can also be used, each burst 101 to 103 presenting data on a single band distinct from the others, corresponding to a spectral band associated with a distinct specific wavelength, these different bursts being associated with wavelengths that are distinct (although spectrally close) and therefore colored differently, such that they are seen as a multiple-wavelength (or multi-band) signal when they are assembled together.

The network of FIG. 3 also comprises optical routing elements, referenced 2-1 to 2-4, also called routing nodes, receiving the optical bursts transmitted by the different source nodes of the network. Thus, the routing node 2-1 receives the single-band data bursts 101, 102, 103 from the source nodes 1-1 to 1-3, and combines them into a succession of data bursts (that can be called "multi-band" because they are transmitted on different OFDM bands) transmitted to a next routing node (here the node 2-3).

To avoid burst collisions in the network, a sophisticated control plane is advantageously implemented. This control plane consists of the control units of the equipment items (in particular of the source nodes), the control channel which interconnects them and the messages exchanged over this control channel. This control plane takes into account the travel times between the elements of the network, for example by an external synchronization mechanism and the exchange of timestamps, or by a so-called "ranging" process.

This control plane implements exchanges of messages between the source nodes, the destination nodes and the control units to provide information on the communication need of the source nodes, on the occupancy of the receivers in the destination nodes or the source nodes. For example, by periodically sending reports to the control unit (centralized or distributed), the source nodes provide information on the state of their queues, while the control units inform the source nodes of the dates at which they can transmit to the destination nodes. In another example, the control unit receives a passband request between several elements of the network via a control plane of a client equipment item (for example, GMPLS (Generalized Multi-Protocol Label Switching) request from routers).

Such a control plane can be implemented in a centralized control unit controlling the scheduling of the data bursts to all of the destination nodes. Such a control unit manages all the reservations by assigning to each source node resources to be used to transmit data bursts to any destination. Alternatively, such a control plane can be implemented in a distributed control unit in the network, which indicates to the source nodes the instants at which they must transmit, by using a requests and grants mechanism. The control unit or units, whether centralized or distributed, implement computation algorithms to determine the transmission and reception dates and assign grants with messages granting transmission to the source nodes.

This control plane needs to know the travel times between the different network elements so as to decide the appropriate moments for the transmission of the OFDM single-band bursts.

The data from the routing nodes 2-1 and 2-2 are then routed in the network to other multi-band burst routing nodes, referenced 2-3 and 2-4, which transmit these optical bursts (for example according to their color, i.e. their wavelengths) so that the latter are presented at the input of the destination node for which they are intended, typically in the form of a succession (in temporal terms) of optical bursts. Here, the bursts 101, 102 and 103 are broadcast by the routing nodes 2-3 and 2-4 to a destination node referenced 3-1 out of the different destination nodes of the optical network (only two destination nodes referenced 3-1 and 3-2 being illustrated here).

It will be noted that the system illustrated in FIG. 3 can be applied to a network comprising both edge nodes and core network nodes. The edge nodes can contain a single source or several sources (transmission side) and one receiver or several receivers (reception side) as illustrated in FIG. 3, bearing in mind that, to ensure a two-way communication, the edge nodes contain a transmission part and a reception part.

Figure 4:
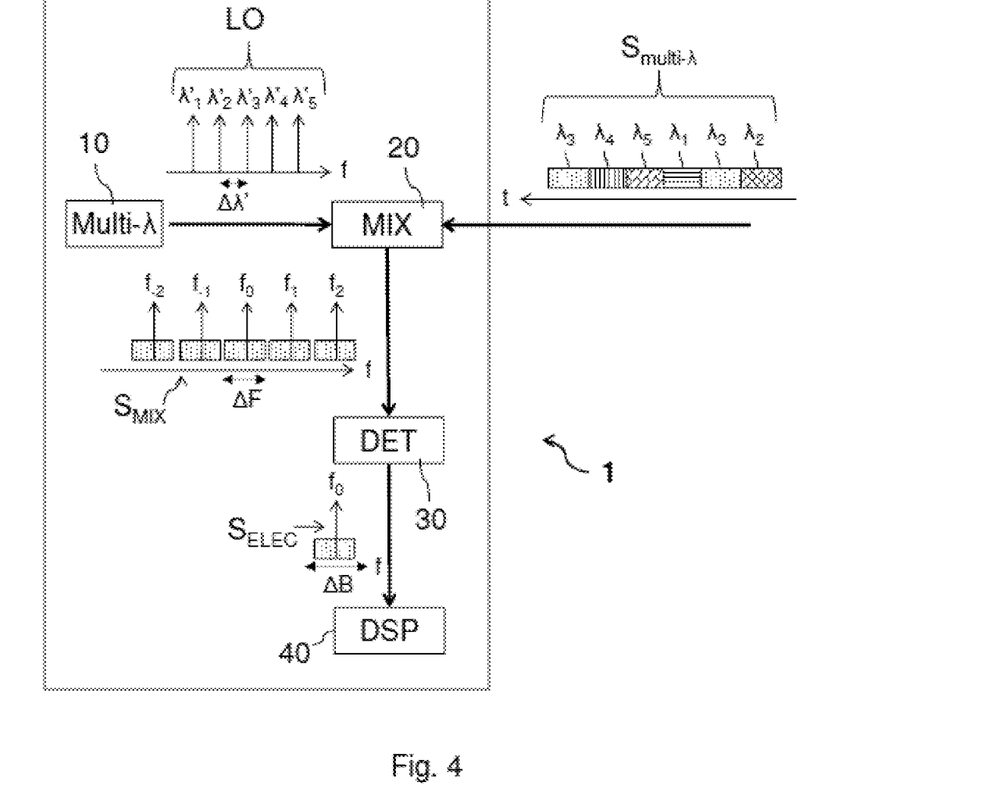
FIG. 4 illustrates a coherent optical receiver according to an embodiment of the invention.

We refer now to FIG. 4 which illustrates an embodiment of the coherent optical receiver according to the invention, capable of receiving the single-band colored bursts described previously.

In this FIG. 4, the coherent optical receiver 1 can receive, from an optical network as illustrated previously, a multiple-wavelength optical signal $S_{Multi-\lambda}$ composed of a plurality of single-band optical bursts, in particular a succession (from the temporal point of view) of single-band optical bursts. Each single-band burst transports data over a given spectral band $\Delta F$ (typically with a width of the order of 8 to 9 GHz), for example by using OFDM modulation, this spectral band being carried by a wavelength (situated typically in the middle of this band) out of a plurality of predefined so-called "carrier" wavelengths $\lambda_1$ to $\lambda_5$, separated from one another by a fairly small spectral deviation $\Delta\lambda$ (typically of the order of 10 GHz).

Thus, in a purely illustrative manner, the signal $S_{Multi-\lambda}$ is illustrated as being composed of a succession of single-band bursts, in this case a first burst consisting of a spectral band carried by the wavelength $\lambda_3$, followed by a second burst consisting of a spectral sub-band carried by the wavelength $\lambda_4$, followed by a third burst consisting of a spectral subband carried by the wavelength $\lambda_5$, followed by a fourth burst consisting of a spectral subband carried by the wavelength $\lambda_1$, followed by a fifth burst consisting of a spectral subband carried (again) by the wavelength $\lambda_3$, followed by a sixth burst consisting of a spectral subband carried by the wavelength $\lambda_2$, etc.

The optical receiver 1 comprises in particular optical generation means 10 arranged to deliver a multiple-wavelength optical local oscillator LO composed of a plurality of optical lines with wavelengths $\lambda'_1$ to $\lambda'_5$ corresponding respectively to the abovementioned carrier wavelengths $\lambda_1$ to $\lambda_5$. "Corresponding" should be understood here to mean that the wavelengths $\lambda'_1$ to $\lambda'_5$ of the optical lines are ideally the same as the wavelengths $\lambda_1$ to $\lambda_5$ used to transmit the bursts in the optical network, but that there can also be a slight offset between each line wavelength $\lambda'_1$ and the wavelength $\lambda_1$ corresponding to it, this offset being able to be tolerated within a certain limit (e.g. a few hundreds of MHz, typically 300 MHz at most) without the principle of the invention being compromised. The deviation $\Delta\lambda'$ between the wavelengths $\lambda'_1$ to $\lambda'_5$ of the lines is preferably identical to the deviation $\Delta\lambda$ between the carrier wavelengths $\lambda_1$ to $\lambda_5$, for example of the order of 10 GHz. The offset between the wavelengths $\lambda'_1$ of the lines and the wavelengths $\lambda_1$ corresponding to them can possibly be controlled by means of a referencing of the wavelengths used in the network combined with an ad-hoc closed-loop control mechanism at the receiver.

In other words, more generally, when N wavelengths $\lambda_1$ to $\lambda_N$ can be used to transmit optical signals to a given optical receiver in the optical network employed, the optical generation means 10 of this optical receiver generate an optical local oscillator LO exhibiting N optical lines at the wavelengths $\lambda'_1$ to $\lambda'_N$ of values identical to the wavelengths $\lambda_1$ to $\lambda_N$ or at the very least very close thereto (to within a few tens or even a few hundreds of MHz). More specifically, the optical generation means 10 generate a single optical local oscillator LO (i.e. a single multiple-wavelength optical signal intended to be transmitted over a single optical fiber) and not a plurality of optical local oscillators (i.e. a plurality of single-wavelength optical signals intended to be transmitted over several optical fibers).

Furthermore, the optical lines at the predefined wavelengths $\lambda'_1$ to $\lambda'_5$ of the optical local oscillator LO are advantageously generated in such a way as to each exhibit a very fine line width (typically less than 400 kHz, preferentially lying between 50 and 100 kHz) in order to avoid inducing phase noise on the reception of the signal $S_{Multi-\lambda}$. As an example, these optical generation means 10 can be implemented in the form of a passively mode-locked low-noise laser (passively mode-locked laser) with quantum wells. Such an implementation, integrated and economically inexpensive, is in fact likely to meet the present constraints in terms of spectral deviation between lines and of phase noise, subject to definitively fixing the spacing between the lines from the construction of the laser (such a laser chip therefore addresses one, and only one, inter-line spacing value).

The optical receiver 1 further comprises optical mixing means 20 arranged to mix the optical local oscillator LO from the optical generation means 10 with the multiple-wavelength optical signal $S_{Multi-\lambda}$. In particular, these optical mixing means 20 are arranged to receive two optical signals at the input, namely the signal $S_{Multi-\lambda}$ and the single optical local oscillator LO, and not a plurality of optical local oscillators transmitted separately. The result thereof, at the output of the optical mixing means 20, is a so-called "mixed" optical signal $S_{MIX}$ in which, for each successive burst of the signal $S_{Multi-\lambda}$, there are optical beats between the optical burst concerned and the optical lines of the multiple-wavelength optical local oscillator LO. These optical mixing means 20 typically comprise a 90° optical hybrid whose two inputs respectively receive the signals LO and $S_{Multi-\lambda}$ and whose two outputs supply the phase I and quadrature Q components of the signal $S_{MIX}$.

FIG. 4 shows the result of this mixing upon the reception of the first burst (carried by the wavelength $\lambda_3$). The mixing of this optical burst with the lines of the signal LO generates an optical signal $S_{MIX}$ exhibiting a series of optical beats centered at certain particular frequencies $f_2,f_1,f_0,f_1,f_2$ which constitute as many spectral copies of the burst concerned (the five beats with each of the lines $\lambda'_1$ have been represented).

The frequencies of the beats correspond to the differences between the carrier wavelength $\lambda_3$ of the first burst and the wavelengths of the lines of the signal LO, the central frequency $f_0$ thus corresponding to the difference between the wavelength $\lambda_3$ carrying the first burst and the wavelength $\lambda'_3$ (corresponding to the wavelength $\lambda_3$) of the third line of the signal LO, the frequency $f_1$ corresponding to the difference between the wavelength $\lambda_3$ of the first burst and the wavelength $\lambda'_4$ of the fourth line of the signal LO, the frequency $f_1$ corresponding to the difference between the wavelength $\lambda_3$ of the first burst and the wavelength $\lambda'_2$ of the second line of the signal LO, and so on. Ideally, this central frequency $f_0$ is nil when the wavelengths $\lambda_3$ and $\lambda'_3$ are exactly identical, and therefore when the lines of the signal LO are perfectly aligned on the wavelengths used to transmit the bursts, but it may be that this central frequency $f_0$ is of a low value close to 0 MHz, then corresponding between the deviation between the wavelength $\lambda'_3$ of the third line of the signal LO and the wavelength $\lambda_3$ used to transmit the first burst.

Once the first burst is mixed with the optical local oscillator LO, the second burst is then mixed with this same signal LO, then supplying a mixed optical signal $S_{MIX}$ composed of new optical beats, and so on.

The optical receiver 1 further comprises optical detection means 30 receiving, from the optical mixing means 20, the mixed optical signal $S_{MIX}$ composed, for each optical burst, of the above optical beats.

The first function of these optical detection means 30 is to convert the optical signal received into an electrical signal that can be processed by conventional processing means 40, typically implemented in the form of a digital signal processing (DSP) processor.

Furthermore, in the present embodiment, these detection means 30 exhibit a certain processing passband $\Delta B$, converting and letting pass the signals within this passband while they reject the signals outside of this passband. This passband is here set to let pass one or more relevant beats in the signal $S_{MIX}$, in particular the beat between the single-band optical burst carried by the wavelength $\lambda_1$ and the optical line at the wavelength $\lambda'_1$ corresponding (i.e. identical or very close) to this wavelength $\lambda_1$ situated spectrally around the central frequency $f_0$ in the mixed optical signal $S_{MIX}$.

Advantageously, this passband can be set to leave only the single beat around the central frequency $f_0$ in order to disregard the other beats resulting from the mixing between the optical burst and the lines of the optical local oscillator LO at different wavelengths at a distance from the carrier of this optical burst, this case being particularly appropriate when a single single-band optical burst is received per given timeslot.

For this, the passband $\Delta B$ of the detection means 30 is arranged as a function of the spectral band $\Delta F$ occupied by the beat or beats to be retained within the signal $S_{MIX}$. This passband $\Delta B$ can thus take one of the following forms depending on whether the signal $S_{MIX}$ is filtered in the optical or electrical domain, even in both domains in succession:

When the passband $\Delta B$ of the detection means 30 is defined as corresponding to the optical processing passband of an optical module within the detection means 30 (for example the passband of a photo-electrical conversion module or that of an optical filter situated upstream of such a conversion module, even of all these modules), the filtering is done in the optical domain and the passband ΔB then advantageously exhibits a width slightly greater than that of the spectral band ΔF of the optical beat to be retained (for example, a bandwidth ΔB of 10 GHz for an optical spectral width ΔF of approximately 8 GHz for a single-band burst). The detection means then act as a bandpass filter centered on the spectral band of the beat to be retained.

When the passband ΔB of the detection means 30 is defined as corresponding to the electrical processing passband of an electrical module within the detection means 30 (for example the passband of an electronic amplifier at the output of a photo-electrical conversion module, of an analog-digital conversion module, or even of a digital processing module downstream of such a conversion module, even of all of these modules), the filtering is done in the electrical domain and the passband ΔB then advantageously exhibits a width slightly greater than the half-width of the spectral band ΔF of the optical beat to be retained (for example, a bandwidth ΔB of 5 GHz for an optical spectral width ΔF of approximately 8 GHz for a single-band burst). Since this passband ΔB is bounded by the nil frequency in as much as this type of electrical module operates in baseband, the detection means then act as a low-pass filter.

When guard intervals of a certain width (for example 1 GHz, even less) separate the spectral bands carried by the single-band optical bursts, the width ΔB of the passband required can be chosen so as to be close to the half-sum of the width of the spectral band of the burst considered and of the width of the guard spectral intervals surrounding it, for example a width ΔB lying between 4 and 5 GHz (defined for an electrical module and a filtering in the electrical domain as presented previously) when the burst exhibits a spectral band of width less than or equal to 8 GHz with guard intervals of width greater than or equal to 1 GHz. Thus, a single beat is filtered, without components belonging to other adjacent beats being filtered.

Thus, for each single-band burst received, the detection means 30 supply to the processing means 40 an electrical signal $S_{ELEC}$ corresponding to the optical-electrical conversion of the optical beat centered on the frequency $f_0$ obtained for this burst (this signal $S_{ELEC}$ being able to consist solely of this beat), this operation being reiterated for each successive burst. The processing means 40 can then process this electrical signal in a conventional manner (demodulation, decoding, etc.).

Figure 5:
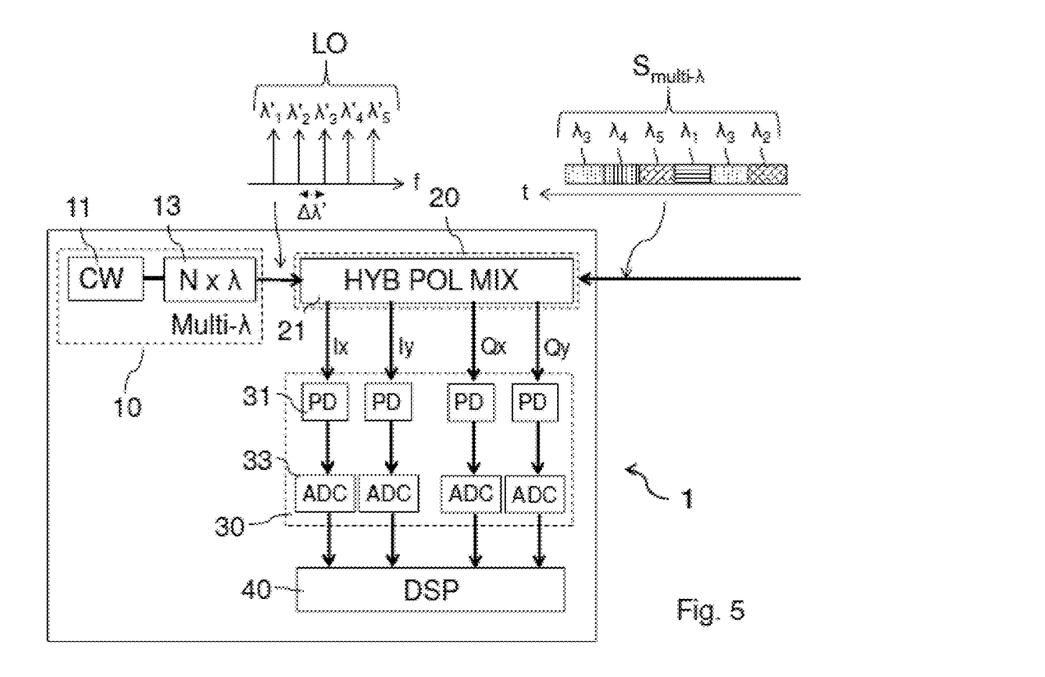
FIG. 5 illustrates a variant of the optical receiver according to an embodiment of the invention.

We refer now to FIG. 5 which illustrates a more specific variant of the first embodiment of the optical receiver according to the invention, capable of receiving the single-band colored bursts described previously.

This example illustrates a variant of the optical generation means 10 in which the latter comprise an optical source 11 which generates a continuous wavelength (CW) optical signal. It can be in particular an external cavity laser with small spectral line width (from 50 to 100 kHz).

The optical generation means 10 also comprise a multiple-wavelength generation module 13 arranged to deliver, from the continuous wavelength optical signal received from the optical source 11, the local multiple-wavelength optical signal exhibiting optical lines at the wavelengths $\lambda'_1$ to $\lambda'_5$.

This multiple-wavelength generation module 13 can for example consist of a Mach-Zehnder modulator (MZM), controlled by a very high power RF signal at a frequency equal to the spacing Δλ' between the optical lines of the optical local oscillator to be generated (Δλ'=10 GHz for example, if the carriers used to transmit the bursts exhibit this spectral deviation). Such a Mach-Zehnder modulator can notably be of the type of those discussed in the articles "Ultra-flat optical frequency comb generator using a single-driven dual-parallel Mach-Zehnder modulator" by Qiang Wang et al. (*Optics Letters*, vol. 39, No. 10, 2014) or even "Asymptotic formalism for ultraflat optical frequency comb generation using a Mach-Zehnder modulator" by Takahide Sakamoto et al. (*Optics Letters*, vol. 32, No. 11, 2007).

Alternatively, this multiple-wavelength generation module 13 can be implemented in the form of a phase modulator inserted into a Fabry-Pérot cavity fed by the continuous signal CW from the optical source 11, for example of the type of that discussed in the article "Low-noise and broadband optical frequency comb generation based on an opto-electronic oscillator" by Xiaopeng Xie et al. (*Optics Letters*, vol. 39, No. 4, 2014).

The phase modulator is controlled by an RF voltage at a frequency equal to a multiple of the free spectral interval of the Fabry-Pérot cavity. This RF voltage can be generated by photo-detection of the optical signal oscillating in the Fabry-Pérot cavity. Thus, by adjusting the length of the Fabry-Pérot cavity, and therefore the frequency of the RF voltage applied to the phase modulator, it is possible to set the spacing Δλ' between the lines of the signal LO such that it corresponds to the spacing Δλ between the carrier wavelengths used for the colored bursts.

Furthermore, in this example of FIG. 5, the optical mixing means 20 comprise an optical hybrid module with polarization diversity 21 which breaks down each optical signal resulting from the mixing between the signal LO and one of the bursts of the multiple-wavelength signal received $S_{Multi-\lambda}$ into four optical components Ix, Iy, Qx and Qy corresponding to the two polarizations X and Y of the signal received and to the two phase I and quadrature Q components. Two 90° hybrid modules (one per polarization) can be employed here.

Each of the four optical components Ix, Iy, Qx and Qy then exhibits a certain series of optical beats, for a very short time duration corresponding to a given burst, and is processed by detection means 30 which are specific to it.

In the example of FIG. 5, these detection means 30 are composed, for each component to be received, of an optical-electrical conversion module 31 followed by an analog-digital conversion module 33 (ADC for "Analog-Digital Converter"). The function of the optical-electrical conversion module 31 (typically a photodiode) is to pass the optical component received by converting it into the electrical domain. The function of the analog-digital conversion module 33 is to digitize the converted electrical signal supplied by the optical-electrical conversion module 31, in order to allow the subsequent processing thereof in the processing module 40.

In this example, the passband of the detection means 30 is defined by the high cut-off frequency of the optical-electrical conversion module 31 and of the analog-digital conversion module 33. The width of the passband ΔB of the detection means 30 can then be adjusted by setting this cut-off frequency, for example by choosing ADC components with a cut-off frequency of 5 GHz, or by setting the cut-off frequency of such ADC components to 5 GHz, if the aim is to filter the beats in an optical spectral band of 10 GHz.

Figure 6:
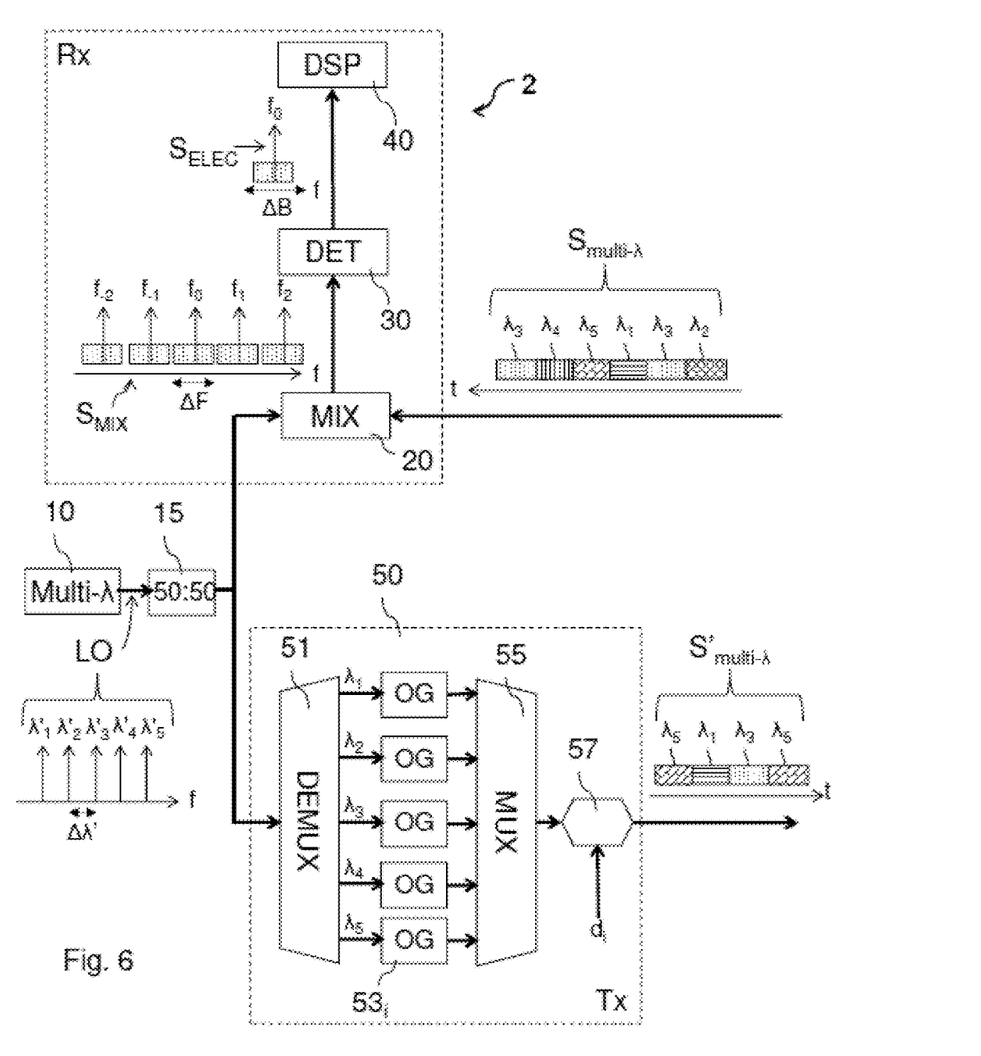
FIG. 6 illustrates an optical transceiver according to another embodiment of the invention.

We refer now to FIG. 6 which illustrates an embodiment of an optical transceiver according to the invention, capable of receiving and of transmitting multi-band colored bursts as described previously.

In this optical transceiver 2, the "reception" part (designated "Rx") comprises the means 20, 30 and 40 of the receiver as described previously, whereas the "transmission" part (designated "Tx") comprises transmission means 50 which will be described herein below, these two parts pooling the use of the optical generation means 10 in order to be able to use the multiple-length optical local oscillator LO both in transmission and in reception.

This optical transceiver 2 thus first of all comprises optical generation means 10 generating a multiple-wavelength optical local oscillator LO, composed of a plurality of optical lines at wavelengths $\lambda_1$ to $\lambda_5$. The transceiver 2 further comprises an optical divider 15 (such as a 50:50 coupler) dividing the local oscillator LO into two identical optical signals (but that have reduced optical power) intended to respectively supply the "reception" part and the "transmission" part of the transceiver 2.

Thus, a first part of the local oscillator LO (in this case the first optical signal at the output of the optical divider 15) is supplied to the optical mixing means 20 of the "reception" part, in order to be able to be mixed with a multiple-wavelength optical signal $S_{Multi-\lambda}$ received by the transceiver 2 from an optical network, the component(s) resulting from this mixing being detected by detection means 30, then processed electrically by processing means 40 as described previously.

A second part of the local oscillator LO (in this case the second optical signal at the output of the optical divider 15) is supplied to the transmission means 50 in order to allow the transmission of a multiple-wavelength optical signal $S'_{Multi-\lambda}$ composed of a succession of single-band optical bursts each carried by a wavelength length $\lambda_1$ from among the predefined wavelengths $\lambda_1$ to $\lambda_5$.

These transmission means 50 in particular comprise an optical demultiplexer 51 whose input receives the second optical signal at the output of the optical divider 15 (exhibiting optical lines at the wavelengths $\lambda_1$ to $\lambda_5$) and having N outputs (here N=5) on each of which it separately delivers the optical lines at the wavelengths $\lambda_1$ to $\lambda_5$.

These transmission means 50 further comprise N optical gates $53_i$ (or OGs) that can be integrated in a photonic integrated circuit (PIC), connected respectively to the N outputs of the optical demultiplexer 51 (itself being able to be integrated in the preceding integrated circuit), each optical gate $53_i$ thus processing only a single optical line at a given wavelength. The outputs of the N optical gates $53_i$ are connected to the N inputs of an optical multiplexer 55 (which itself can be integrated in the preceding integrated circuit), which delivers as output an optical signal spectrally combining the optical lines possibly present at the output of these optical gates.

In operation, in as much as the optical generation module 10 supplies a continuous multiple-wavelength signal to the demultiplexer 51 which demultiplexes them to the N optical gates $53_i$, these optical gates $53_i$ each continuously receive an optical line at a particular wavelength of the multiple-wavelength signal. It is sufficient for just one of these gates to be opened while all the others are closed, for a sufficiently short time period (of the order of a few μs), to obtain at the output of the optical multiplexer 55 a burst of a short duration carried by the wavelength of the optical line processed by the single open optical gate $53_i$. The tunability (corresponding to the change of wavelength from one burst to the next) is thus assured by the control of the changing of open gate (out of the N optical gates $53_i$), from a first optical gate associated with a first wavelength to be used for a current burst to a second optical gate associated with a second wavelength to be used for the next burst. This control can be managed by a common controller (not illustrated) controlling the opening and the closing of the different optical gates $53_i$ in order to let pass only a component of different wavelength from one burst to another.

The optical signal at the output of the optical multiplexer 55 is then supplied to an optical modulator 57, which modulates the successive optical bursts of this optical signal with electrical data $d_i$ to be transmitted in order to obtain the optical signal $S'_{Multi-\lambda}$ to be transmitted in an optical network, this modulator being able to be a complex PDM-CMZM modulator (Polarization Division Multiplexed-Complex Mach-Zehnder Modulator), capable of supplying a complex modulation of QAM (Quadrature Amplitude Modulation) type on the two polarizations of the light that can allow the variation of the bit rate transported by the optical sub-bands carried by each burst.

Here, purely illustratively, the signal $S'_{Multi-\lambda}$ is illustrated as being composed of a first burst carried by the wavelength $\lambda_5$, followed by a second burst carried by the wavelength $\lambda_1$, followed by a third burst carried by the wavelength $\lambda_3$, followed by a fourth burst carried (again) by the wavelength $\lambda_5$. This corresponds to the opening during a first very short timeslot of the optical gate $53_5$ (combined with the closing of the other optical gates), followed by the opening during a second very short timeslot of the optical gate $53_1$ (combined with the closure of the gate $53_5$, the other gates being already closed), followed by the opening during a third very short timeslot of the optical gate $53_3$ (combined with the closure of the gate $53_1$, the other gates being already closed), followed by the opening during a fourth very short timeslot of the optical gate $53_5$ (combined with the closure of the gate $53_3$, the other gates being already closed), and so on, these operations being controlled and synchronized by a controller common to the optical gates $53_i$. This common controller can in particular belong to the control plane described previously.

Obviously, the invention is not limited to the exemplary embodiments described and represented above, from which it will be possible to provide other modes and other embodiments, without in any way departing from the scope of the invention.

In particular, as already indicated, the modulation format of the data in the bands occupied by the bursts is not limited to OFDM, but can also be a Nyquist-WDM modulation or any other modulation format allowing optimal occupancy of a reduced spectral band, in particular with a substantially rectangular occupancy profile.

Also, the coherent receiver has been illustrated previously in the particular case of a succession of bursts that do not temporally overlap, without it being necessarily limited to this particular situation.

Finally, although a network with source nodes using fixed wavelength optical transmitters has been illustrated in detail, the invention is not limited to this single type of network and the above coherent optical receiver can also be used in destination nodes of an optical network comprising source nodes with tunable wavelength optical transmitters.

The invention claimed is:

1. A coherent optical receiver configured to receive a multiple-wavelength optical signal comprising a succession of single-band optical bursts, each single-band optical burst being carried by a wavelength out of a plurality of carrier wavelengths over a determined spectral band, the optical receiver comprising:

optical generation means arranged to deliver a multiple-wavelength optical local oscillator comprising a plurality of optical lines with wavelengths corresponding to the carrier wavelengths, said optical generation means comprising an optical source generating a continuous wavelength optical signal and a multiple-wavelength generation module arranged to deliver, from the continuous wavelength optical signal received from the optical source, the multiple-wavelength optical local oscillator;

optical mixing means arranged to mix the multiple-wavelength optical local oscillator and the multiple-wavelength optical signal in order to deliver at least one mixed optical signal comprising a plurality of beats between at least one of the single-band optical bursts and the optical lines of the multiple-wavelength optical local oscillator; and detection means whose passband is arranged to filter, from the mixed optical signal, at least one beat between said at least one single-band optical burst and one of the optical lines of the multiple-wavelength optical local oscillator.

2. The coherent optical receiver as claimed in claim 1, wherein the passband of the detection means is arranged to let pass only the beat between said at least one single-band optical burst and the optical line of a wavelength corresponding to the wavelength carrying said at least one single-band optical burst and reject the beats between said at least one single-band optical burst and the other optical lines of wavelength not corresponding to the wavelength carrying said at least one single-band optical burst.

3. The coherent optical receiver as claimed in claim 1, wherein the optical source generates an optical signal of spectral line width less than 400 kHz.

4. An optical network comprising at least one of the coherent optical receiver of claim 1 or an optical transceiver configured to receive a first multiple-wavelength optical signal and to transmit a second multiple-wavelength optical signal comprising a succession of single-band optical bursts, each single-band optical burst being carried by a wavelength out of a plurality of carrier wavelengths over a determined spectral band, the optical transceiver comprising:

optical generation means arranged to deliver a multiple-length optical local oscillator comprising a plurality of optical lines with wavelengths corresponding to the carrier wavelengths;

optical mixing means arranged to mix a part of the multiple-wavelength optical local oscillator and the first multiple-wavelength optical signal in order to deliver at least one mixed optical signal, comprising a plurality of beats between at least one of the single-band optical bursts and the optical lines of the multiple-wavelength optical local oscillator;

detection means whose passband is arranged to filter, from the mixed optical signal, at least one beat between said at least one single-band optical burst and one of the optical lines of wavelength of the multiple-wavelength optical local oscillator; and transmission means arranged to receive at least part of the multiple-wavelength optical local oscillator and generate the second multiple-wavelength optical signal by means of said at least part of said multiple-wavelength local optical signal.

5. The coherent optical receiver as claimed in claim 3, wherein the optical source generates an optical signal of spectral line width equal to 100 kHz.

6. An optical transceiver configured to receive a first multiple-wavelength optical signal and to transmit a second multiple-wavelength optical signal comprising a succession of single-band optical bursts, each single-band optical burst being carried by a wavelength out of a plurality of carrier wavelengths over a determined spectral band, the optical transceiver comprising:

optical generation means arranged to deliver a multiple-length optical local oscillator comprising a plurality of optical lines with wavelengths corresponding to the carrier wavelengths;

optical mixing means arranged to mix a part of the multiple-wavelength optical local oscillator and the first multiple-wavelength optical signal in order to deliver at least one mixed optical signal, comprising a plurality of beats between at least one of the single-band optical bursts and the optical lines of the multiple-wavelength optical local oscillator;

detection means whose passband is arranged to filter, from the mixed optical signal, at least one beat between said at least one single-band optical burst and one of the optical lines of wavelength of the multiple-wavelength optical local oscillator; and transmission means arranged to receive at least part of the multiple-wavelength optical local oscillator and generate the second multiple-wavelength optical signal by means of said at least part of said multiple-wavelength local optical signal.

7. The optical transceiver as claimed in claim 6, wherein the transmission means comprise:

an optical demultiplexer arranged to separate said at least part of the multiple-wavelength optical local oscillator into a plurality of single-wavelength optical signals corresponding to said optical lines;

a plurality of optical gates respectively receiving said optical signals corresponding to said optical lines, an optical multiplexer combining the outputs of said optical gates; and an optical modulator arranged to modulate, over a determined spectral bandwidth, the optical signal at the output of the optical multiplexer with data to be transmitted.

8. A method for coherent reception of a multiple-wavelength optical signal in an optical network, said multiple-wavelength optical signal comprising a succession of single-band optical bursts, each single-band optical burst being carried by a wavelength out of a plurality of carrier wavelengths over a determined spectral band, the method comprising:

generating a multiple-wavelength optical local oscillator composed of a plurality of optical lines with wavelengths corresponding to the carrier wavelengths;

mixing the multiple-wavelength optical local oscillator and the multiple-wavelength optical signal in order to deliver at least one mixed optical signal, comprising a plurality of beats between at least one of the single-band optical bursts and the optical lines of the multiple-wavelength optical local oscillator; and filtering, from the mixed optical signal, at least one beat between said at least one single-band optical burst and one of the optical lines of the multiple-wavelength optical local oscillator, wherein the steps of mixing and filtering are repeated iteratively for each successive single-band optical burst comprising the multiple-wavelength optical signal.

9. A coherent optical receiver configured to receive a multiple-wavelength optical signal comprising a succession of single-band optical bursts, each single-band optical burst being carried by a wavelength out of a plurality of carrier wavelengths over a determined spectral band, the optical receiver comprising:
  optical generation means arranged to deliver a multiple-wavelength optical local oscillator comprising a plurality of optical lines with wavelengths corresponding to the carrier wavelengths;
  optical mixing means arranged to mix the multiple-wavelength optical local oscillator and the multiple-wavelength optical signal in order to deliver at least one mixed optical signal comprising a plurality of beats between at least one of the single-band optical bursts and the optical lines of the multiple-wavelength optical local oscillator; and
  detection means whose passband is arranged to filter, from the mixed optical signal, at least one beat between said at least one single-band optical burst and one of the optical lines of the multiple-wavelength optical local oscillator, wherein the detection means comprise at least one optical module, the optical module comprising at least one of an optical filter and a photo-electrical conversion module, the passband of the processing means corresponding to the passband of the optical module and exhibiting a spectral width greater than the width of the spectral band of said at least one single-band optical burst.

10. The coherent optical receiver as claimed in claim 9, wherein the passband of the detection means is arranged to let pass only the beat between said at least one single-band optical burst and the optical line of a wavelength corresponding to the wavelength carrying said at least one single-band optical burst and reject the beats between said at least one single-band optical burst and the other optical lines of wavelength not corresponding to the wavelength carrying said at least one single-band optical burst.

11. The coherent optical receiver as claimed in claim 9, wherein the optical source generates an optical signal of spectral line width less than 400 kHz.

12. A coherent optical receiver configured to receive a multiple-wavelength optical signal comprising a succession of single-band optical bursts, each single-band optical burst being carried by a wavelength out of a plurality of carrier wavelengths over a determined spectral band, the optical receiver comprising:
  optical generation means arranged to deliver a multiple-wavelength optical local oscillator comprising a plurality of optical lines with wavelengths corresponding to the carrier wavelengths;
  optical mixing means arranged to mix the multiple-wavelength optical local oscillator and the multiple-wavelength optical signal in order to deliver at least one mixed optical signal comprising a plurality of beats between at least one of the single-band optical bursts and the optical lines of the multiple-wavelength optical local oscillator; and
  detection means whose passband is arranged to filter, from the mixed optical signal, at least one beat between said at least one single-band optical burst and one of the optical lines of the multiple-wavelength optical local oscillator, wherein the detection means comprise a photo-electrical conversion module followed by at least one electrical module processing the mixed optical signal after conversion in the photo-electrical conversion module, the electrical module comprising at least one of an analog-digital conversion module and a digital processing module, the passband of the processing means corresponding to the passband of the electrical module and exhibiting a spectral width greater than the half-width of the spectral band of said at least one single-band optical burst;
  wherein the spectral bands of the single-band optical bursts are separated by a guard spectral interval, and wherein the width of the passband of the detection means is less than the half-sum of the width of the spectral band of one of the single-band bursts and of the widths of the guard spectral intervals surrounding it.

13. The coherent optical receiver as claimed in claim 12, wherein the width of the spectral band of the single-band optical bursts is less than or equal to 8 GHz, wherein the width of the guard spectral intervals is greater than or equal to 1 GHz, and wherein the width of the passband of the detection means lies between 4 and 5 GHz.

14. The coherent optical receiver as claimed in claim 12, wherein:
  the passband of the detection means covers at least one central frequency (fc) equal to the difference between the wavelength carrying said at least one single-band optical burst and the wavelength of the optical line corresponding to said carrier wavelength, the central frequency comprising a zero central frequency.

* * * * *